Oct. 30, 1928.
L. F. LAMPLOUGH
1,689,205
METHOD OF AND APPARATUS FOR CONTINUOUSLY SHEATHING CORES
Original Filed May 29, 1926
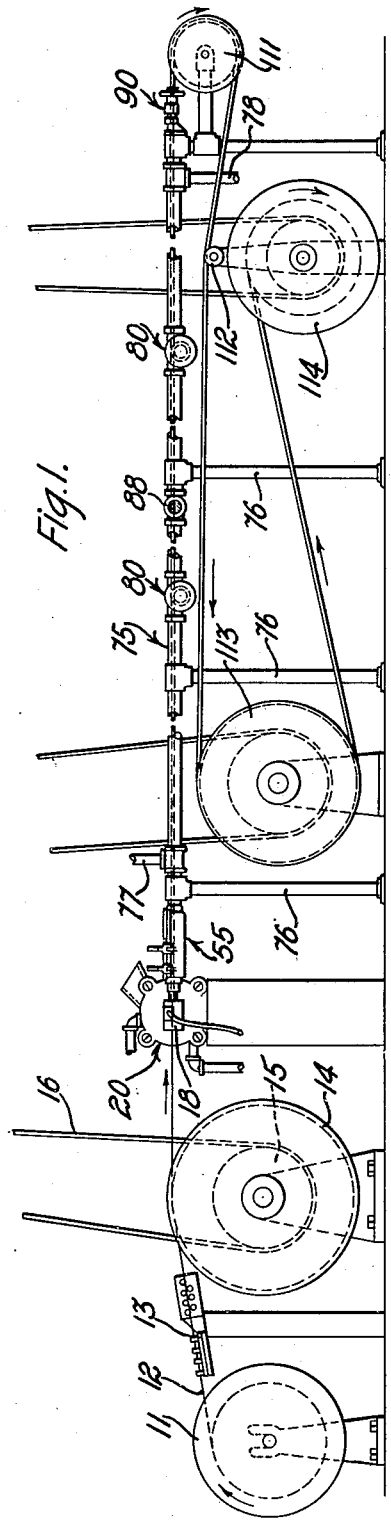
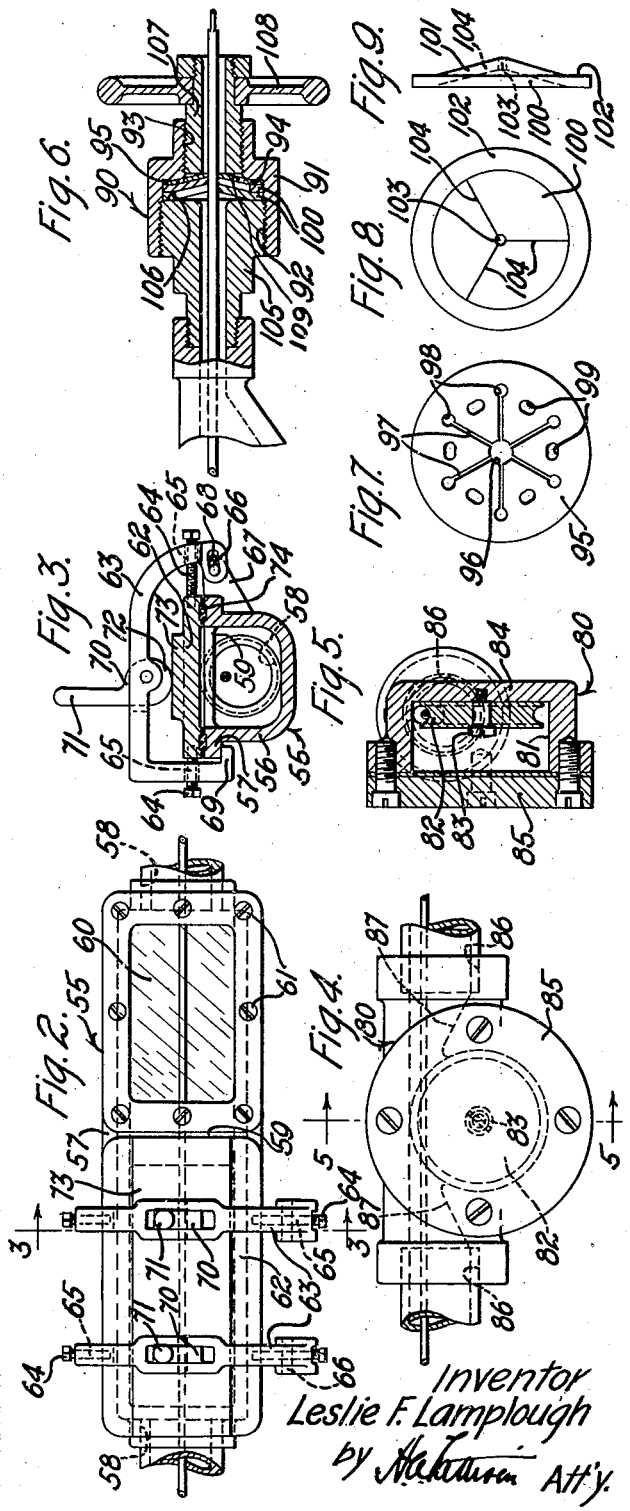
Inventor
Leslie F. Lamplough
by *[signature]* Att'y.

Patented Oct. 30, 1928.

1,689,205

UNITED STATES PATENT OFFICE.

LESLIE FAWCETT LAMPLOUGH, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR CONTINUOUSLY SHEATHING CORES.

Application filed May 29, 1926, Serial No. 112,600. Renewed September 18, 1928.

This invention relates to a method of and apparatus for continuously sheathing cores, and more particularly to a method of and apparatus for continuously applying and vulcanizing plastic insulating coatings upon wires and cables.

An object of the invention is to produce vulcanized articles continuously in a simple, expeditious and practical manner.
Other objects of the invention are to provide a method of and apparatus for continuously sheathing cores with a uniform coating of a vulcanizable material and continuously vulcanizing the material on the cores synchronously with the application of the sheath.

According to the general features of the invention, a core of the material to be sheathed, such as a wire or cable, is passed from a supply reel through a mechanism provided with an extrusion head through which the strand passes, which extrudes a coating of unvulcanized insulating material upon the strand as it is advanced therethrough.
Connected to the extruding mechanism is a vulcanizing chamber into which the coated strand passes directly without access to the atmosphere and in which the insulating material is subjected to sufficient heat and pressure to vulcanize it. The strand, now covered with a vulcanized insulating coating, emerges from the vulcanizing chamber through a seal, which tends to maintain the pressure within the chamber, and is wound upon a storage reel where it may remain until used.

It is believed that the invention will be clearly understood from the following detailed description taken in connection with the annexed drawings, showing one embodiment of the invention in an apparatus by means of which the method may be practiced, and in which—

Fig. 1 is a side elevation of an apparatus embodying the invention;

Fig. 2 is an enlarged plan view of a connecting member comprising a part of the apparatus;

Fig. 3 is a vertical section thereof taken substantially on line 3—3 of Fig. 2;

Fig. 4 is an enlarged side elevation of a part of the vulcanizing chamber;

Fig. 5 is a vertical section thereof taken substantially on line 5—5 of Fig. 4;

Fig. 6 is an enlarged vertical section of the pressure seal;

Fig. 7 is an enlarged detail view of a metal disk used in the seal;

Fig. 8 is an enlarged detail view of a composition disk used in the seal, and

Fig. 9 is an enlarged edge view thereof.

It is to be understood, however, that the above mentioned figures are merely illustrative and that the invention is not limited to the exact form of apparatus disclosed therein but is subject to any change or modification within the scope of the appended claims.

In the drawings, in which like numerals designate like parts throughout the several views, one embodiment of the invention is illustrated which is adapted to cover an electric wire with an insulating coating of rubber. The apparatus embodying the invention is provided with a supply reel 11 from which a wire 12 which is to be covered is drawn through a wire straightening device 13 of any desired form by means of a capstan 14 around which the wire passes, the capstan being driven through a pulley 15 by means of a belt 16 connected to a suitable source of power (not shown), at a speed slightly greater than that of the wire to relieve tension on the wire during its passage through the vulcanizing chamber, hereinafter described. From the capstan the wire passes through a head 18 of an extrusion mechanism, designated generally by the numeral 20, which is adapted to extrude a uniform coating of unvulcanized insulating material on the wire as it emerges from the head 18. The extrusion mechanism 20 may be of any well known type and is illustrated only diagrammatically since a complete description of its construction is not essential to completely understand the invention. It suffices to say that it is provided with a conveying screw which forces the insulating material under high pressure through a die around the wire as it passes through the extrusion head 18, which may be of any suitable type, a very satisfactory type being disclosed in the copending application Serial No. 112,599, filed May 29, 1926, by R. C. Kivley.

A connecting member 55 (Figs. 2 and 3) effects a pressure-tight connection between the head 18 and a vulcanizing chamber 75, hereinafter described, the connecting member 55 comprising a U-shaped body portion 56 provided with a flange 57 extending around the upper portion thereof and being provided at each end with a threaded opening 58 for attaching it to the adjoining members. A bridge member 59 is provided which divides the upper opening of the body portion 56 into two sections, one of which is covered by a sight glass 60 held in pressure-tight connection with the flange 57 in any suitable manner such as by bolts 61. The other section of the opening is covered by a door 62 which is loosely carried in yokes 63—63 by means of bolts 64—64 which pass through slots 65 in the yokes, the yokes 63—63 being hinged to the body portion 56 by means of pins 66 carried by the lugs 67 on the body portion 56 and fitting into slots 68 in one end of the yokes 63—63. The opposite ends of the yokes 63—63 are provided with hook like portions 69 which are adapted to engage with the under portion of the flange 57. The yokes 63—63 also carry cam members 70—70 provided with handle portion 71—71 on one end and cam surfaces 72—72 at the other end which are adapted to engage with the raised surface 73 of the door 62 to hold the door 62 tightly in place, a gasket 74 being fitted between the door 62 and the flange 57 to make a pressure-tight fit.

The vulcanizing chamber 75 is supported by a series of standards 76 and is provided with an inlet pipe 77 and an outlet pipe 78 for conveying a heated non-oxidizing vulcanizing medium, such as steam, under pressure into and out of the chamber. Located at equal intervals along the chamber are a plurality of members 80 (Figs. 4 and 5) comprising chamber portions 81 in which sheaves 82 for guiding the wire in its passage through the chamber are secured by means of stud bolts 83 screwed into tap holes provided in heavy side walls 84, caps 85 being provided to cover the chamber portion after the sheaves are inserted. The members 80 are provided at each end with threaded openings 86 for connecting it to the adjacent members, tapered passages 87 connecting the openings 86 with the chamber portions 81 being provided for guiding a strand of material inserted through the openings 86 over the sheaves 82. Additional sight glasses, such as 88, may be provided at intervals along the chamber if desired to permit examination of the wire therein.

At the end of the vulcanizing tube opposite the entrance end there is provided a seal 90 (Fig. 6) which permits the covered wire to be drawn from the chamber, but which prevents the escape of more than a predetermined amount of the vulcanizing medium from the interior of the chamber. The seal 90 comprises a cup-like member 91 provided with an enlarged threaded opening 92 in one end and a smaller threaded opening 93 leading into the opening 92 from the other end, a shoulder 94 being formed in the bottom of the opening 92. A resilient metal disk 95 is fitted into the opening 92 against the shoulder 94, the disk being provided with a central opening 96 (Fig. 7) through which the wire may freely pass, a series of openings 98 connected to the central opening 96 by radial slots 97 and another series of openings 99, all of which are provided to render the central portion of the disk flexible. A plurality of disks 100 (Figs. 8 and 9) composed of a yieldable material, such as rubber, are fitted in the opening 94 adjacent the metal disk 95, each of the disks 100 comprising a flat peripheral rim 102 and a conical central portion 101 provided with a central opening 103 and a plurality of radial slits 104 intersecting the central opening, the disks being arranged so that the slits in each disk are staggered with respect to those in the adjacent disks.

One end of a hollow connecting member 105 is threaded into the end of the vulcanizing chamber 75, and the other end, which is provided with a straight end surface 106, is threaded so that it may be screwed into the opening 92 of the member 91 and grip the disks 100 and 95 between the shoulder 94 and the end surface 106. A hollow plug 107 provided with a hand wheel 108 rigidly mounted thereon is adapted to screw into the threaded opening 93 of the member 91 so that an end surface 109 thereon may press against the metal disk 95 and thereby force the yieldable disks 100 tightly against the vulcanized coating on the wire passing therethrough. The yieldable disks effect a substantially pressure-tight seal with the insulating coating because of their dished form, for when force is applied to the apex of the conical portions the altitude is reduced, and since the outer rims of the disks are confined and the slant height of the conical portions is constant, it results that the peripheries of the central openings 103 are forced tightly into contact with the vulcanized coating. The vulcanized wire emerges from the vulcanizing chamber 75 through the seal 90 and is drawn over a sheave 111 and an idler 112 by means of a capstan 113 around which the wire passes before being wound upon a take-up reel 114, the capstan 113 and the reel 114 being suitably driven from a source of power (not shown) by means of pulleys and belts.

The operation of the device is as follows: The end of the uncovered wire 12 is threaded through the wire straightening device 13, around the capstan 14, through the head 18 of the extrusion device, through the connecting member 55, the vulcanizing tube 75, and the seal 90, around the sheave 111 and capstan 113, and onto the take-up reel 114. The door 62 is clamped tightly in place by means of the cams 72 and the seal 90 is released. Power is then applied to the various driven members and a quantity of unvulcanized insulating material, such as a rubber compound, is inserted into the extrusion mechanism which forms a compact, uniform sheathing of the unvulcanized material around the wire 12. The operator, upon looking into the sight glass 60, near the extrusion head, may note when the insulating material begins to appear within the vulcanizing chamber, and then immediately admit the hot vulcanizing medium into the vulcanizing chamber 75 through the pipe 77, whereupon the vulcanizing process begins. The coated wire continues through the vulcanizing tube 75, throughout which it is subjected to a vulcanizing temperature and pressure, and by the time the wire emerges through the seal 90 the coated material is vulcanized to the desired degree. The pressure upon the disks 95 and 100 within the seal 90 is adjusted so that a small amount of the vulcanizing medium escapes through the central openings 96 and 103 therein around the insulating sheath as it passes therethrough, the escaping vulcanizing medium thereby acting as a cushion between the sheath and the disks which tends to prevent the insulation from being stripped from the core. Sufficient time elapses during the travel of the wire around the sheave 111, the capstan 113 and onto the take-up reel 114 for the insulating material to cool. The material is wound upon the take-up reel 114 where it may be stored until used.

Should the wire be broken within the chamber near the connecting member 55, the power is disconnected, the supply of the vulcanizing medium is stopped, and the seal 90 is released. The handle portions 71—71 carried by the cam members 70—70 are then forced to the right, as seen in Fig. 3, thereby releasing the pressure upon the door 62, and the yokes 63—63 are slid to the left until the hooks 69 are free of the flange 57, this motion being possible because of the slots 68. The yokes 63—63 are then swung upwardly carrying the door 62 with them, and the interior of the connecting member 55 is then exposed. The broken ends of the wire may then be brought within the body portion 56 of the connecting member 55 and joined together. The yokes 63—63 may then be swung back into position and slid over until the hooks 69 engage under the flange 57, and the cam members 70—70 may be operated to clamp the door 62 tightly into position, when the apparatus is ready to resume operations.

Should the wire be broken at a point some distance away from the connecting member 55, instead of bringing the broken ends of the wire within the body portion 56 of the connecting member and joining them therein, the portion of the wire furthest advanced would be withdrawn from the vulcanizing chamber 75 and the remaining portion threaded through the vulcanizing chamber 75, the seal 90 and onto the take-up reel 114, as is done in starting the apparatus, and the operation then started anew. In any event, the door 62 in the connecting member 55 affords ready access to the interior of the vulcanizing chamber 75 for the purpose of inspecting the wire therein, or threading the wire therethrough or for joining broken ends of the wire.

What is claimed is:

1. In an apparatus for producing sheathed articles, a device for applying a sheathing of a vulcanizable substance on a core, a vulcanizing chamber connected directly thereto, means for causing relative movement between the sheathed core and the chamber, and means for admitting a non-oxidizing vulcanizing medium under pressure into the chamber in direct contact with the vulcanizable substance, whereby the sheathing substance is vulcanized.

2. In an apparatus for producing sheathed articles, means for extruding a sheathing of a vulcanizable substance upon a core, a vulcanizing chamber connected directly with the extruding means, means for advancing the sheathed core through the chamber, and means for admitting a hot, non-oxidizing vulcanizing medium under pressure into the chamber and into direct contact with the vulcanizable substance whereby the substance is vulcanized.

3. In an apparatus for producing sheathed articles, an extrusion mechanism adapted to extrude a sheathing of a vulcanizable substance upon a core, a vulcanizing chamber, means for effecting a pressure-tight connection between the chamber and the extrusion mechanism, means for advancing the sheathed core through the extrusion mechanism and through the chamber, means for admitting a hot, non-oxidizing vulcanizing medium under pressure into the chamber and into direct contact with the vulcanizable substance, and a seal for permitting the sheathed core to be drawn from the chamber and for retaining the vulcanizing medium within the chamber.

4. In an apparatus for producing sheathed articles, a device for applying a vulcanizable substance to a core, a vulcanizing chamber connected directly thereto, means for advancing the sheathed core through the chamber, means for admitting a hot, non-oxidizing vulcanizing medium into the chamber, and a seal for permitting the sheathed core to be withdrawn from the chamber having means for allowing only a small portion of the vulcanizing medium to escape to form a protective cushion around the sheathing substance.

5. In a continuous vulcanizing device, an elongated vulcanizing chamber, means for drawing a core sheathed with a vulcanizable substance through the chamber, an inlet pipe for admitting a hot, non-oxidizing vulcanizing medium into the chamber, and a seal for permitting the withdrawal of the sheathed core from the chamber and for retaining the vulcanizing medium within the chamber, comprising a tubular body portion having a cup-shaped depression therein, a plurality of yieldable disks fitted into the depression provided with central openings through which the sheathed strand may pass, and means for forcing the periphery of the openings in the disks tightly into contact with the sheathing on the strand.

6. In an apparatus for producing sheathed articles, an elongated vulcanizing chamber, a material applying device including extrusion means for forcing a vulcanizable substance under pressure around a core and into the chamber, means for advancing the sheathed core through the chamber, rotatable means for supporting the core within the chamber, a seal at the exit end of the chamber making a substantially pressure-tight engagement with the sheathing on the core, and means for admitting a hot, non-oxidizing vulcanizing medium into the chamber under pressure, whereby the vulcanizing medium is retained in the chamber by the pressure of the extruding means at one end and by the seal at the other end of the chamber.

7. In a continuous vulcanizing device, a vulcanizing chamber, means for forcing vulcanizable material into the chamber under pressure, means for admitting a hot, non-ixidizing vulcanizing medium into the chamber under pressure and into direct contact with the vulcanizable material, means for withdrawing the material from the chamber, and a seal for permitting the material to be withdrawn and for retaining the vulcanizing medium within the chamber.

8. In a continuous vulcanizing device, a vulcanizing chamber, means for admitting a vulcanizing medium into the chamber under pressure and into direct contact with vulcanizable material, means at one end of the chamber for forcing vulcanizable material into the chamber under pressure, and a seal at the other end of the chamber for retaining the vulcanizing medium therein, but permitting withdrawal of the vulcanized material.

9. In an apparatus for producing sheathed articles, a vulcanizing chamber, means for admitting a vulcanizing medium into the chamber under pressure, a material applying device including means for forcing a sheathing of a vulcanizable substance around a core and into the chamber against the pressure of the vulcanizing medium, means for conveying the sheathed core through the chamber, and a seal for retaining the vulcanizing medium within the chamber.

10. In an apparatus for producing sheathed articles, a vulcanizing chamber, means for admitting a vulcanizing medium into the chamber under pressure, a material applying device including means for forcing a sheathing of a vulcanizable substance around a core and into the chamber against the pressure of the vulcanizing medium, means for conveying the sheathed core through the chamber, and a seal for retaining the vulcanizing medium within the chamber, comprising a tubular member having a cup-shaped depression therein, a resilient metal disk fitted into the depression provided with a central opening through which the sheathed strand may pass, and a plurality of radial slots intersecting the central opening, a plurality of yieldable dish-shaped disks fitted into the depression adjacent the metal disk, provided with central openings for the strand to pass through, and means for forcing the metal disk against the yieldable disks, whereby the peripheries of the openings therein are forced tightly into contact with the vulcanized sheathing on the core.

11. In an apparatus for producing sheathed articles, a material applying device including means for sheathing a core with a vulcanizable substance, a vulcanizing chamber, and a connecting member for effecting a pressure-tight connection between the chamber and the sheathing means, comprising a U-shaped body portion provided with attaching means at each end and a quick-opening door closing the upper portion of the body.

12. In an apparatus for producing sheathed articles, a material applying device including means for sheathing a core with a vulcanizable substance, a vulcanizing chamber, and a connecting member for effecting a pressure-tight connection between the chamber and the sheathing means, comprising a U-shaped body portion provided with attaching means at each end, a sight glass covering substantially half of the upper portion of the body, and a quick-opening door closing the remainder of body portion.

13. In an apparatus for producing sheathed articles, a material applying device including means for sheathing a strand of material with a vulcanizable substance, a vulcanizing chamber, and a connecting member for effecting a pressure-tight connection between the chamber and the sheathing means, comprising a U-shaped body portion provided with attaching means at each end, a sight glass covering substantially half of the upper portion of the body, a door hinged to the body portion adapted to close the remaining upper body portion, and means for effecting a pressure-tight fit between the door and the body portion.

14. A process of making sheathed articles, consisting in sheathing a core with a vulcanizable substance, and immediately passing the sheathed core through a non-oxidizing vulcanizing medium before exposing it to the atmosphere.

15. A process of making sheathed articles, consisting in continuously sheathing a strand of material with a vulcanizable substance, then passing the sheathed strand directly into a hot, non-oxidizing vulcanizing medium before exposing it to the atmosphere, and finally withdrawing the sheathed strand from the vulcanizing medium, whereby the substance is vulcanized by the direct action of the vulcanizing medium.

16. A process of making sheathed articles, consisting in continuously sheathing cores of materials with a uniform coating of a vulcanizable substance and continuously vulcanizing the substance on the cores synchronously with the application of the sheath by immediately subjecting the substance to the direct action of a hot, non-oxidizing vulcanizing medium before exposing it to the atmosphere.

17. A process of making sheathed articles, consisting in continuously sheathing cores of materials with a uniform coating of a vulcanizable substance and continuously vulcanizing the substance on the cores synchronously with the application of the sheath by immediately passing the sheathed cores through a hot, non-oxidizing vulcanizing medium before exposing it to the atmosphere.

18. A process of making sheathed articles, consisting in sheathing a strand of material with a vulcanizable substance, passing the sheathed strand into a zone in which is present a hot, non-oxidizing vulcanizing medium under pressure, withdrawing the sheathed strand from the zone and simultaneously allowing a small portion of the vulcanizing medium to escape with the sheathed strand, thereby forming a protective cushion around the sheathing substance.

19. A method of withdrawing a sheathed strand of material from a zone in which is present a hot, non-oxidizing vulcanizing medium under pressure, which consists in permitting a small amount of the vulcanizing medium to escape with the sheathed strand as it is withdrawn to form a protective cushion around the sheathing substance.

20. In an apparatus for covering a core with a vulcanizable insulating material, means for applying material to the core, a chamber for treating the material, said applying means connected directly to said chamber and serving as a seal for the entrance to the treating chamber, and means for admitting a vulcanizing medium under pressure into the chamber into direct contact with the vulcanizable material.

21. In an apparatus for covering a core with insulating material, means for applying the material to the core under pressure, a chamber for treating the material with a fluid medium under pressure, and means for connecting the treating chamber to the applying means allowing the pressure in the applying means to counteract the pressure in the chamber to prevent the escape of the fluid medium from the chamber.

22. In an apparatus for covering a core with a vulcanizable insulating material, means for applying the material to the core, a chamber for treating said material, means for connecting the applying means and the treating chamber so as to pass the core and the applied material directly from the applying means to the treating chamber, and means for admitting a vulcanizing medium under pressure into the chamber into direct contact with the vulcanizable material.

23. In an apparatus for continuously covering a core with insulating material having a chamber for treating the material, a seal for the treating chamber comprising a disk of flexible material having a central opening, a second disk of resilient material contacting with the first disk and having a central opening from which radial slots run partly to the periphery, and means for varying the pressure of the resilient disk on the flexible disk.

In witness whereof, I hereunto subscribe my name this 22nd day of May A. D., 1926.

LESLIE FAWCETT LAMPLOUGH.